United States Patent
Sieron

[15] 3,696,362
[45] Oct. 3, 1972

[54] LOW ELECTROLYTE LEVEL ALARM DEVICES

[72] Inventor: Richard L. Sieron, Old Saybrook, Conn.

[73] Assignee: Dual-Lite Company, Newton, Conn.

[22] Filed: Sept. 14, 1970

[21] Appl. No.: 71,807

[52] U.S. Cl. .............................. 340/244 C, 307/252
[51] Int. Cl. ............................................. G08b 21/00
[58] Field of Search .340/244, 244 C; 73/304, 304 C; 137/392

[56] References Cited

UNITED STATES PATENTS

| | | |
|---|---|---|
| 3,498,131 | 3/1970 | Rickey .................... 340/244 C |
| 3,131,335 | 4/1964 | Berglund et al. ........ 340/244 C |
| 3,584,643 | 6/1971 | Burke ....................... 340/244 |
| 3,257,643 | 6/1966 | Jensen ..................... 340/244 C |
| 3,540,027 | 11/1970 | Rauth et al. ............. 340/244 C |
| 3,373,351 | 3/1968 | Rak .......................... 73/304 |

Primary Examiner—Thomas B. Habecker
Attorney—Mattern, Ware & Davis

[57] ABSTRACT

Two electrodes immersed in an electrolyte solution shunt the gate of a "Triac" solid state switching device connected in parallel with a current-limiting resistor which is connected via an alarm device across a power source. When the electrodes are immersed below the surface of the electrolyte, they serve as a closed switch drawing minimum current through the current limiting resistor, thus biasing the "Triac" in its non-conductive mode and trickling through the alarm device at amperage levels so low that the alarm device does not respond. When the electrolyte level falls, leaving the electrodes above the electrolyte solution, they become an open circuit. This reduces the trickle current to zero and applies full power source voltage to the gate of the "Triac," triggering the "Triac" from a current blocking mode to a conductive mode. This permits an alarm current to pass through the "Triac," thereby drawing this higher amperage current through the alarm device, producing an alarm signal indicating the level of the electrolyte.

14 Claims, 2 Drawing Figures

INVENTOR.
RICHARD L. SIERON

BY

MATTERN WARE AND DAVIS
ATTORNEYS 3,696,362

LOW ELECTROLYTE LEVEL ALARM DEVICES

SUMMARY OF THE INVENTION

This invention relates to electrolyte level alarm devices, and more particularly to alarm devices for acid and alkaline liquid electrolyte storage batteries.

Existing electrolyte level indicating devices are undesirable since they require operator initiation and surveillance. Furthermore, these systems utilize the battery plates as part of their circuits, and generally are arranged to produce a positive indication when the electrolyte level is above the fill point and to produce no indication when more electrolyte is required.

Therefore, it is a principal object of this invention to produce an electrolyte level alarm device, capable of self-initiation of an alarm signal when the electrolyte level is lower than desired.

Another object of this invention is to provide an electrolyte level alarm device that is simple, reliable, and easily installed.

Another object of this invention is to provide an electrolyte level alarm device which not only indicates when electrolyte is needed, but also reports a high charge condition caused by a charger malfunction before battery damage results.

A further object of this invention is to provide an electrolyte level alarm device which operates independently of battery voltage, and avoids degradation of battery plates.

Another object is to provide an electrolyte level alarm device having an audible alarm equipped with a fail-safe silencing switch, and a flashing lamp tell-tale reminder.

A further object is to provide an electrolyte level alarm device capable of disconnecting an associated battery charger upon actuation until the predetermined electrolyte level is restored.

Another object of this invention is to provide an electrolyte level alarm device capable of operating independently of the number of existing cells.

A still further object of this invention is to provide an electrolyte level alarm device which requires no external electrical connection to the normal battery charge-discharge terminals, and which is energized by an external alternating current source, avoiding any "net" terminal plating effect.

Another object of this invention is to provide a low electrolyte level alarm device which operates independently and does not produce gas at either electrode.

Another object of this invention is to provide a low electrolyte level alarm device which incorporates a storage battery fill cap capable of replacing the conventional fill cap, so as not to require the drilling of a new hole in the battery casing.

Other and more specific objects will be apparent from the features, elements, combinations and operating procedures disclosed in the following detailed description and shown in the drawings.

The low electrolyte level alarm device according to this invention incorporates in a level sensor two electrodes which are immersed in the electrolyte solution and perform as a switch which is closed when the electrolyte is above the fill level and is open when the electrolyte falls below the fill level. The alarm device also incorporates a transformer which assures the proper voltage level to the alarm circuit, a buzzer, a current-limiting resistor, and a "Triac" solid state switching device.

The transformer-buzzer alarm circuit includes the "Triac" in parallel with the resistor, and the sensor electrodes shunt the "Triac's" gate. When the electrodes are immersed in the electrolyte, the current flow path is through an alarm actuating relay coil, through the resistor, through the electrolyte and back to the transformer. Since the resistor assures a current below 1 ma. the relay is not energized and the alarm does not operate. When the electrolyte level falls below the electrodes, the small current through the resistor is interrupted, and full transformer voltage is applied to the "Triac's" gate, whereby the "Triac" is triggered and acts as a virtual short by-passing the current-limiting resistor. This causes the amperage level in the circuit to increase greatly and initiates operation of the buzzer and of a flashing lamp tell-tale reminder.

The electrodes immersed in the electrolyte are sheathed with a thin coating of polymer material and are supported in a fill cap which may be substituted for the standard fill cap of a storage battery. The polymer coating shields the electrode from the corrosive nature of the electrolyte and the fill cap electrodes are connected with a socket plug for easy removal from and connection to the alarm circuit. The low electrolyte level alarm device operates independently, without any external electrical connection to the normal battery charge-discharge terminals, and is simple, reliable and easily connected.

THE DRAWINGS

FIG. 1 is a perspective view, partially in cross-section, of a level sensor having each two electrodes, sheathed with a thin coating of polymer material, and supported in a cap incorporating a socket plug connection; and FIG. 2 is an electrical diagram of the associated circuit comprising the low electrolyte alarm device.

DETAILED DESCRIPTION

Figure 1:
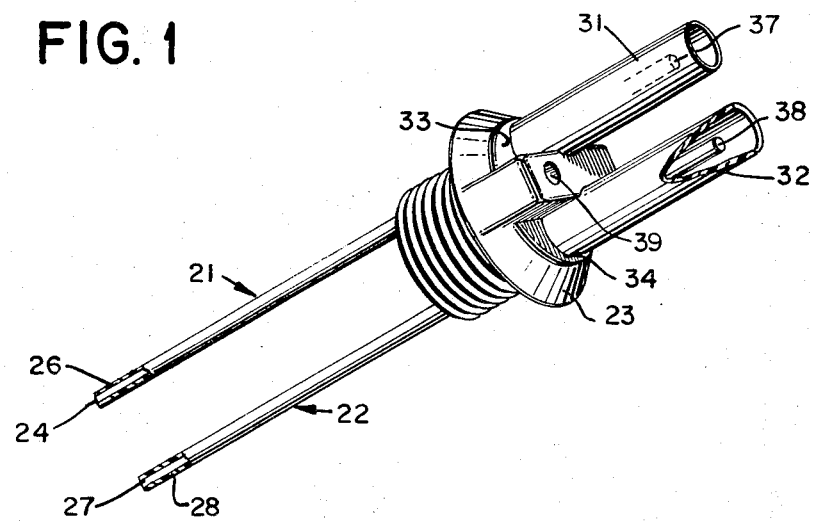

In FIG. 1, electrodes 21 and 22 are shown supported in a fill cap 23. Electrode 21 comprises a conductive metal rod 24 surrounded by a thin polymer coating 26, and electrode 22 comprises a metal rod 27 surrounded by a thin polymer coating 28. The terminating end of electrode 21 is connected to a metal socket plug 37, and, similarly, electrode 22 is connected to a metal socket plug 38. Socket plugs 37 and 38 assure that electrodes 21 and 22 can be quickly disconnected and connected to the alarm circuit ready for operation.

Electrode 21 and socket plug 37 are surroundingly supported within plastic housing 31. Electrode 22 and socket plug 38 are similarly held within plastic housing 32. Plastic housings 31 and 32 are adhesively anchored in holes 33 and 34 of cap 23. Also, cap 23 is provided with a vent hole 39 to assure proper operation of the storage battery at atmospheric conditions.

Figure 2:
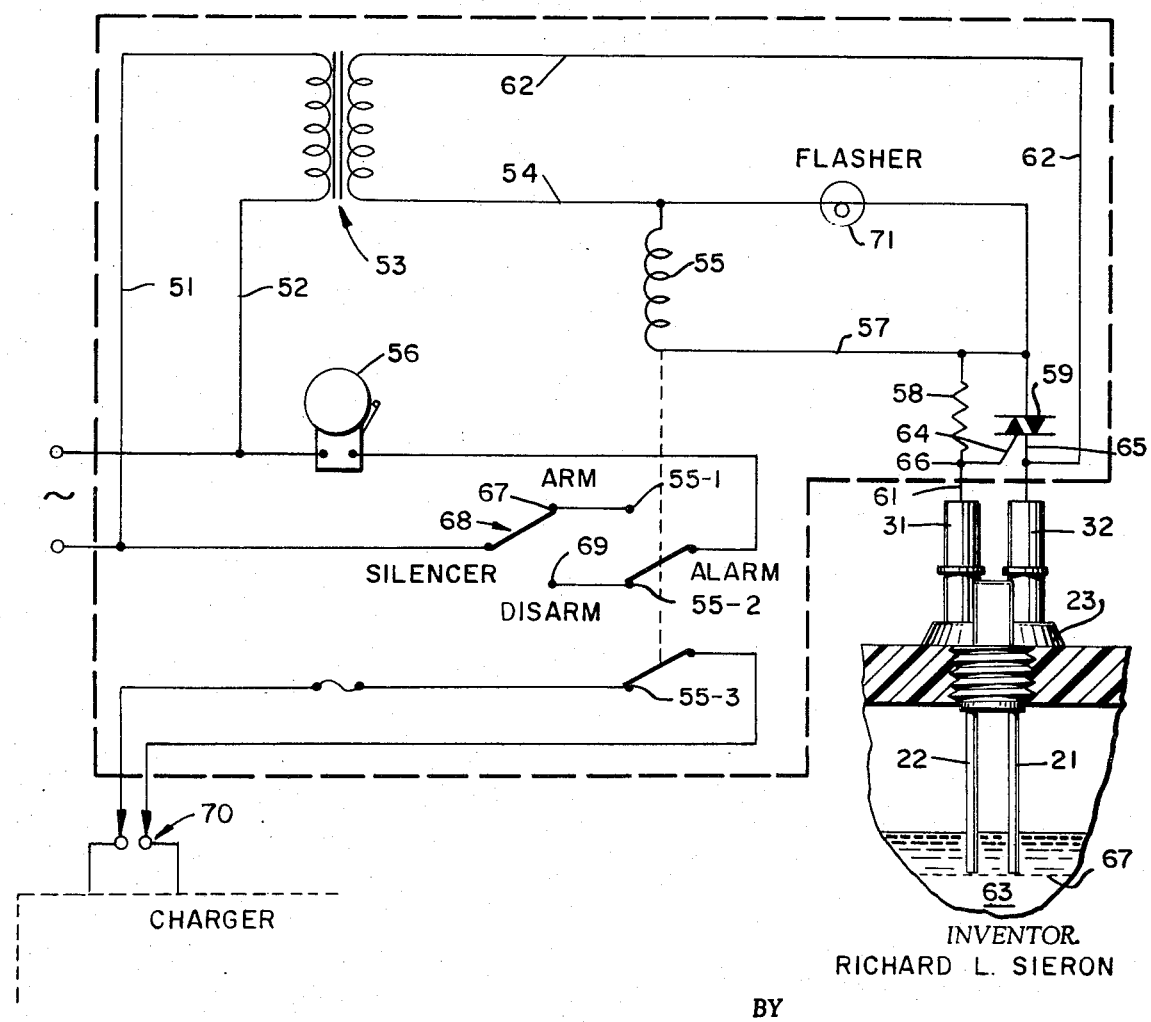

The complete electrical diagram for the low electrolyte level alarm device is shown in FIG. 2. The input 115-volt alternating current is supplied via lines 51 and 52 to transformer 53. Transformer 53 provides assurance that the alarm current on lines 54 and 62 through the alarm device circuit is isolated from the power line. Output line 54 from the secondary winding of transformer 53 is connected to one terminal of an alarm relay 55 connected to control the actuation of an audible alarm buzzer 56, and a line 57 from the other terminal of the relay 55 is connected to both a resistor 58 and a "Triac" 59 in parallel. The other end of resistor 58 is connected to a junction 66. A line 61 connects junction 66 to electrode 21, and a line 64 connects junction 66 to the gate of "Triac" 59. "Triac" 59 and electrode 22 are both connected by a line 62 to the secondary winding of transformer 53.

When the level sensor electrodes 21 and 22 are immersed in electrolyte 63, a monitoring current will be carried from electrode 21 through electrolyte 63 to electrode 22 and vice versa. Since the electrolyte's resistance is extremely small in the immersed condition, the monitoring current path from transformer 53 will be along line 54 through alarm relay 55, resistor 58, electrodes 21 and 22, and back to transformer 53 via line 62. "Triac" 59 functions to block current flow, acting as an open circuit, and thereby assuring that only a low "trickle" monitoring current flows through resistor 58 and electrodes 21 and 22 at a level insufficient to energize relay 55 to actuate buzzer 56.

Resistor 58 is preselected to assure that the monitoring current through the circuit will never exceed 1 ma. This low current precludes gas formation due to ionization at either of the electrodes 21 and 22. Gas formation is also prevented by using alternating current, since this continually changes the charge of electrodes 21 and 22.

At any time when the level of electrolyte 63 falls below electrodes 21 and 22 to level 67, no monitoring current can pass between the electrodes. When the trickle current through resistor 58 is thereby interrupted, the full output potential of transformer 53 is applied across the gate of "Triac" 59 between lines 64 and 65, triggering the device to its conductive mode and "shorting" resistor 58. Since the circuit now carries a high amperage level current, operation of alarm buzzer 56 is initiated to warn that the electrolyte level has fallen below the desired point.

This high amperage current energizes relay 55, closing relay contacts 55-1 to connect audible alarm 56 across the power line. Contacts 55-1 are shown in their inactive mode in FIG. 2; energization of relay 55 raises the relay armature to close the upper contact 55-1, connecting alarm 56 to the line in series with the upper "armed" contact 67 of a manual silencer switch 68 whose lower "disarmed" contact 69 is connected to the "off" contact 55-2 of relay 55.

Another relay contact 55-3 is connected via a fuse in series with the conventional fuse socket 70 of the battery charger. When relay 55 is energized, contact 55-3 opens, serving as a circuit breaker, de-activating the charger until electrolyte is added to raise its level to an operating depth.

A tell-tale flashing signal lamp 71 is connected in parallel with relay 55, providing a visual alarm supplementing the audible alarm.

If electrolyte filling must be temporarily delayed, the audible alarm 56 is silenced by moving the armature of manual silencing switch 68 from its "armed" contact 67 to its "disarmed" contact 69, but lamp 71 continues flashing until electrolyte is restored.

When the fresh electrolyte 63 again permits monitoring current to flow between electrodes 21 and 22, "Triac" 59 ceases to conduct, relay 55 is de-energized, relay contact 55-3 closes, again activating the battery charger, and alarm contact 55-1 opens. If silencer switch 68 is in its disarmed mode, connecting contacts 69 and 55-2 to the power line, this again activates alarm 56 reminding the operator to switch the silencing switch 68 to its armed contact 67, restoring the entire system to its operating mode, ready for alarm operation whenever electrolyte level 63 again falls beyond the tips of electrodes 21 and 22.

In the preferred embodiment, the electrodes used depend upon the composition of the electrolyte. In an acid electrolyte such as the sulfuric acid solution used in the normal lead-acid battery, a tungsten electrode is preferred since it has been discovered to be the metal most capable of resisting the corrosive nature of the acid. In an alkaline electrolyte, such as potassium hydroxide, normally used in a nickel-cadmium battery, the electrode materials found to be most capable of resisting the corrosive nature of the alkaline solution are nickel plated steel or stainless steel.

The construction and arrangement of the electrodes is unique and solves various problems existing in prior art systems. In the preferred construction of the electrodes, the electrodes will be full length and retained in a replacement fill cap. The full length of the electrodes allows them to be used in any application at any electrolyte level desired by simply cutting off the electrodes to meet the desired level requirements. Furthermore, with potassium hydroxide electrolyte solutions, hydroxide creeps up the electrodes by capillary action. If electrodes 21 and 22 are close together, this creeping coating may reach the underside of the cap 23 and bridge the space between the electrodes, thereby carrying current even though the actual electrolyte level drops below the electrodes. The electrodes according to this invention prevent potassium hydroxide "creep" by remotely spacing the electrodes away from one another, near opposite side edges of the cap 23, and by coating each of the electrodes with an acid and alkaline resistant polymer sheath. This two fold approach effectively prevents the potassium hydroxide from creeping up and bridging across the space between the electrodes.

Although a buzzer has been represented as the signalling device, any attention-getting device could be used. Also, both the buzzer and the "Triac" in series can be connected in parallel with the resistor to accomplish the desired signalling effect. The "Triac" employed in the preferred embodiment is RCA type 4B527. The low electrolyte level alarm device of this invention is capable of effectively performing a dual function. The alarm device not only provides a positive signal indicating when the electrolyte requires the addition of water, but also provides a positive signal indicating a high charge condition which may be caused by any battery charger malfunction. The high charge condition causes the electrolyte to boil off, and when the electrolyte level falls below the electrodes this condition will be efficiently reported by the alarm device which will summon the operator to the battery before permanent battery damage results. Also, the electrodes of this low electrolyte level alarm device are readily installed in any typical storage battery by merely replacing one of the fill caps with the electrode fill cap combination. No additional hole need be drilled, since the electrode assembly replaces the conventional fill cap.

Since this low electrolyte level alarm device operates on 115 volt, 60 Hz, alternating current, there are no polarity problems and no net plating effects resulting at the electrodes. The battery plates are not degraded by the level alarm, and battery voltage is not drained to operate the device. Furthermore, hydrogen product at either electrode in sulfuric acid electrolyte solutions is prevented by using alternating sensing current and by employing a current-limiting resistor which prevents the current through the electrolyte from exceeding 1 ma.

As previously mentioned, the preferred electrodes employed depend upon the type of electrolyte used, are substantially corrosion-proof, are easily adapted to any electrolyte level desired, and eliminate any difficulty due to alkaline electrolyte "creep."

Since the foregoing description and drawings are merely illustrative, the scope of the invention has been broadly stated herein and it should be liberally interpreted so as to obtain the benefits of all equivalents to which the invention is fairly entitled.

What is claimed is:

1. A low electrolyte level alarm device comprising:
   A. a source of alternating current electrical energy;
   B. electrical warning alarm means for gaining attention of operating personnel;
   C. two electrodes normally conductively immersed in said electrolyte; and
   D. automatic switching means connecting the warning means to the energy source, incorporating a thyristor device having a first main terminal connected to said alternating current source and a second main terminal connected through said alarm means to said source, and having a control terminal connected through a current-limiting resistor to said second main terminal, with the two electrodes being directly connected respectively to said first main terminal and to said control terminal,
      1. switchable from a non-conductive mode to a conductive mode in response to interruption of electrolyte conduction of resistor-limited alternating monitoring current between the electrodes,
      2. thereby removing the electrolyte conduction shunt across the first main terminal and the control terminal, applying full triggering potential to the control terminal and completing a conductive circuit through the thyristor, the warning means and the energy source and initiating warning alarm operation of the warning means.

2. A low electrolyte level alarm device as defined in claim 1, wherein said warning means is a buzzer.

3. A low electrolyte level alarm device as defined in claim 1, wherein said electrolyte comprises an acid solution.

4. A low electrolyte level alarm device as defined in claim 3, wherein said electrodes each comprise an elongated tungsten conductive portion surrounded by a thin layer of a nonconductive polymer material.

5. A low electrolyte level alarm device as defined in claim 1, wherein said electrolyte comprises an alkaline solution.

6. A low electrolyte level alarm device as defined in claim 5, wherein said electrodes each comprise an elongated stainless steel conductive portion surrounded by a thin layer of a non-conductive polymer material.

7. A low electrolyte level alarm device as defined in claim 5, wherein said electrodes each comprise an elongated conductive nickel plated steel portion surrounded by a thin layer of a non-conductive polymer material.

8. A low electrolyte level alarm device as defined in claim 1, wherein said thyristor device comprises a "-Triac," incorporating a gate control terminal shunted to the first main terminal by the electrodes normally conductively immersed in the electrolyte.

9. A low electrolyte level alarm device as defined in claim 1, wherein the current drawn from said power source and limited by said current-limiting resistor does not exceed 1 ma. when said electrodes are transferring monitoring current through said electrolyte.

10. The low electrolyte level alarm device defined in claim 1 wherein the two electrodes are positioned in spaced-apart relation depending from the underside of a storage battery fill cap for immersion side-by-side through the same battery fill port into the battery electrolyte.

11. The low electrolyte level alarm device defined in claim 1 wherein the warning means includes an electromagnetic relay coil connected to be energized by the energy source upon switching of the switching means to its conductive mode, with first normally open relay contacts interposed to connect a warning alarm device to a power source when said relay coil is energized to close said first contacts.

12. The device of claim 11 further including a visible warning device connected in parallel with the relay coil to be actuated when the coil is energized.

13. A low electrolyte level alarm device comprising:
   A. a source of electrical energy;
   B. electrical warning alarm means for gaining attention of operating personnel;
   C. two electrodes normally conductively immersed in said electrolyte; and
   D. automatic switching means connecting the warning means to the energy source
      1. switchable from a non-conductive mode to a conductive mode in response to interruption of electrolyte conduction of monitoring current between the electrodes,
      2. thereby completing a conductive circuit through the warning means and the energy source and initiating warning alarm operation of the warning means,
   wherein the warning means includes an electromagnetic relay coil connected to be energized by the energy source upon switching of the energy source upon switching of the switching means to its conductive mode, with first normally open relay contacts interposed to connect a warning alarm device to a power source when said relay coil is energized to close said first contacts, and wherein a manual double pole silencer switch is connected with a normally closed pole in series with the normally open first relay contacts, permitting the user to open said closed pole and to disconnect the warning alarm device while the relay coil is energized, and with a normally open pole connected in series with the normally closed first relay contacts, whereby the user is enabled to re-arm the device while the relay coil is de-energized leaving only the normally open relay contacts as the sole break in the alarm device circuit.

14. A low electrolyte level alarm device comprising:
A. a source of electrical energy;
B. electrical warning alarm means for gaining attention of operating personnel;
C. two electrodes normally conductively immersed in said electrolyte; and
D. automatic switching means connecting the warning means to the energy source
  1. switchable from a non-conductive mode to a conductive mode in response to interruption of electrolyte conduction of monitoring current between the electrodes,
  2. thereby completing a conductive circuit through the warning means and the energy source and initiating warning alarm operation of the warning means,
wherein the warning means includes an electromagnetic relay coil connected to be energized by the energy source upon switching of the switching means to its conductive mode, with first normally open relay contacts interposed to connect a warning alarm device to a power source when said relay coil is energized to close said first contacts, further including a fuse and second normally closed relay contacts connected in series with the fuse socket terminals of a battery charger which is operatively connected to charge the battery whose electrolyte level is being sensed, automatically providing circuit breaker disconnection of the charger from its power supply when energization of the relay coil opens said second normally closed contacts.

* * * * *

UNITED STATES PATENT OFFICE
CERTIFICATE OF CORRECTION

Patent No. 3,696,362               Dated October 3, 1972

Inventor(s) Richard L. Sieron

It is certified that error appears in the above-identified patent and that said Letters Patent are hereby corrected as shown below:

Column 6, lines 61 & 62 - "of the energy source upon switching" should be deleted from the text.

Signed and sealed this 20th day of February 1973.

(SEAL)
Attest:

EDWARD M. FLETCHER, JR.
Attesting Officer

ROBERT GOTTSCHALK
Commissioner of Patents